United States Patent [19]

Bland

[11] Patent Number: 5,922,704
[45] Date of Patent: Jul. 13, 1999

[54] OPTIMAL NUTRITIONAL SUPPLEMENT FOR MEN

[75] Inventor: Jeffrey Bland, Gig Harbor, Wash.

[73] Assignee: Feeling Fine Company LLC, Marina Del Rey, Calif.

[21] Appl. No.: 08/997,754

[22] Filed: Dec. 24, 1997

[51] Int. Cl.[6] ................................................ A61K 31/28
[52] U.S. Cl. ........................ 514/185; 514/549; 514/558; 514/261; 424/630; 424/641; 424/646; 424/668; 424/687
[58] Field of Search ................................ 514/185, 547, 514/558, 201; 424/630, 641, 646, 668, 687

[56] References Cited

U.S. PATENT DOCUMENTS

| 5,403,826 | 4/1995 | Cope et al. ................................ 514/21 |
| 5,686,429 | 11/1997 | Lin et al. .................................. 514/52 |
| 5,733,884 | 3/1998 | Barbul et al. ............................. 514/21 |
| 5,770,215 | 6/1998 | Moshyedi ................................ 424/440 |
| 5,780,039 | 7/1998 | Greenberg et al. ..................... 424/400 |
| 5,807,586 | 9/1998 | Jackson et al. ......................... 424/630 |
| 5,846,569 | 12/1998 | Anderson et al. ...................... 424/535 |
| 5,855,949 | 1/1999 | McLean ................................. 426/804 |

*Primary Examiner*—James H. Reamer
*Attorney, Agent, or Firm*—Lyon & Lyon LLP

[57] ABSTRACT

The present invention provides nutritional supplements for optimal nutrition. Various nutrients are provided in specified ratios to achieve optimal nutrient. For example, omega 3 and omega 6 fatty acids are provided in a ratio of about 2:1. Calcium and magnesium are provided in a ratio of about between 1.3:1 and 1.5:1, and zinc and copper are provided in a ratio of about 5:1. Finally, selenium and iodine are provided in a ratio of about 2:1.

24 Claims, No Drawings

OPTIMAL NUTRITIONAL SUPPLEMENT FOR MEN

FIELD OF THE INVENTION

This invention is in the field of nutritional supplements specifically formulated for men. More specifically, this invention relates to men's nutritional supplements which provide omega fatty acids in conjunction with vitamins, minerals and other nutrients, some of which are provided in carefully controlled ratios.

BACKGROUND

Most evident in the pattern of disease specific to men is the heightened risk of coronary heart disease (CHD) in this group. According to the 1988 Surgeon General's Report, U.S. Dept. Of HHS, SURGEON GENERAL'S REPORT ON NUTRITION AND HEALTH, Public Health Service, PHS Publication No.88-50210 (1988), males in the U.S. are twice as likely to die from CHD as females. In addition, the American Medical Association has recognized the male gender as an independent risk factor for heart disease, along with other factors such as obesity, family history, sedentary lifestyle, and smoking and alcohol consumption.

Components of nutritional supplements can be used by the human body to varying degrees, depending in part on the form of the nutrient provided and any competition for utilization pathways in the body. Thus, there is a need for a men's nutritional supplement which will meet the nutritional requirements of men by not only providing the nutrients needed by men, but also providing these nutrients in the appropriate forms and ratios.

SUMMARY OF THE INVENTION

The present invention provides nutritional supplements for men. In particular, the present formula provides a wide range of nutrients for the overall health of a man. Furthermore, this invention provides specific nutrients needed by men due to male disease risk factors.

Additionally, the present invention provides the nutrients in bioavailable forms to increase the body's ability to use the provided compounds. Perhaps even more important, the present invention provides a number of combinations of nutrients in set ratios, also to increase the body's ability to use the nutrients.

DETAILED DESCRIPTION OF THE INVENTION

The present invention provides nutritional supplements to be taken by men. It is comprised of important nutrients including essential fatty acids. Many of the nutrients of the present invention are supplied in balanced ratios that maximize the uptake and function of the nutrients. The nutrients are also provided in bioavailable forms available to increase the ability of the body to absorb and utilize them.

The formulations of this invention are aimed at creating optimal health in a man by providing nutritional supplementation. Optimal health can only be achieved when each functional component of the body is working at full strength. If the immune system, cardiovascular system, endocrine system, and all the other body functions are not working at their best as a collective whole, the individual cannot be at his best.

RATIOS

Optimal function is based not only on providing the proper nutrients to the body, but also providing the proper balance of these nutrients. This invention has identified four nutritional ratios that are important in helping the body reach the balance required for maximized function. This symbiotic relationship can be defined in the following equation:

RATIO =BALANCE =FUNCTION

Although the levels of nutrients differ based on each biochemically unique user group, the ratios that are imperative for maximal function and optimal health remain constant.

Essential Fatty Acids

The present invention provides alpha-linolenic acid (LNA) (omega 3) and linoleic acid (LA) (omega-6) in a ratio of about 2:1. This ratio is very important because both families of fatty acids follow similar pathways to function, and they compete for enzymes that lead to the formation of fatty acid derivatives. Research has shown that in animals other than humans, the ratio of n-3 to n-6 fatty acids is more important even than absolute amounts of the fatty acids. Boudreau MD, et al., "Lack of Dose Response by Dietary n-3 Fatty Acids at a Constant Ratio of n-3 to n-6 Fatty Acids in Suppressing Eicosanoid Biosynthesis from Arachidonic Acid," Am. J. Clin. Nutr. 54:111–117 (1991). The present invention preferably provides these essential fatty acids in a nutritional supplement for men at the optimum ratio of 2:1.

Essential fatty acids are involved in cardiovascular health as well as in support of the immune system. An imbalance in these essential fatty acids can lead to poor cholesterol metabolism. Additionally, the immune system function can become impaired, leading to inflammation. Inflammation can result in a number of chronic illnesses including joint pain, chronic fatigue, irritable bowel and fibromyalgia.

Calcium: Magnesium

Both calcium and magnesium are involved in bone health, among other functions. For bone health the optimal ratio range of calcium to magnesium is 1.3:1 to 1.5:1. One possible effect of an imbalance between calcium and magnesium is an imbalance in bone minerals which can affect bone growth and bone turnover (the breaking down and building-up of bone). The ratio of 1.5:1 provides a guideline for addressing the need for proper levels of magnesium in a man's diet. Magnesium is equally as important as calcium for bone health and reducing the risk of osteoporosis, which affects men as well as women.

In addition, both calcium and magnesium are involved in cardiovascular health, at the same ratio as for bone health. One possible effect of an imbalance between calcium and magnesium due to excessive calcium intake is increased risk of vascular disorders. The ratio of about 1.5:1.0 for calcium and magnesium provides an appropriate balance of these important nutrients for maintaining proper vascular function. Purvis, J.R., "Effect of Oral Magnesium Supplementation Factors on Selected Cardiovascular Risk Factors in Non-Insulin_Dependent Diabetics," Archives of Family Medicine 3:503–508 (1994).

Zinc:Copper

The minerals zinc and copper are both involved in cardiovascular health, and should be provided in a ratio of 5:1 zinc:copper. An imbalance between these two minerals can cause an antagonistic effect of zinc on copper. This effect can interfere with the body's ability to use copper for supporting cardiovascular health.

Too much zinc relative to copper can also interfere with the body's ability to manufacture SOD (superoxide dismutase), an important heart-protective enzyme. Also, a proper zinc:copper ratio is required to achieve a proper balance of HDL (high density lipoproteins) to LDL (low density lipoproteins).

Selenium:Iodide

These two minerals also have a ratio at which they function most effectively, which is the ratio of selenium to iodide of about 2:1. These minerals affect thyroid function, and therefore also have the resulting effects on metabolism caused by changes in thyroid function. This ratio of 2:1 recognizes the inadequate levels of selenium in the average man's diet. Imbalanced thyroid function can put undue stress on the body that will result in malabsorption of nutrients from food. This, in turn, can retard growth and development.

Pyridoxine:Folate:Cobalamin

These three vitamins also have a ratio at which they function most effectively in the prevention of vascular disorders. The optimal ratio of pyridoxine (vitamin B6) to folate to cobalamin (vitamin B 12) is about 100:4:1, respectively. These vitamins affect cardiovascular function through their abilities to reduce the levels of the potentially toxic amino acid homocysteine. This ratio recognizes the imbalanced and inadequate levels of these vitamins consumed by individuals at risk of heart disease from their diet.

OTHER NUTRIENTS

Besides those ingredients that are supplied in particular ratios and are described above, the present invention supplies many other nutrients that are needed to provide a healthy diet in men.

Vitamin C, vitamin B1 (thiamin), and vitamin E are provided to reduce cardiac risk. Rick of myocardial infarct (MI) for men has been reduced by 37% in a recent Health Pofessinals Follow-Up Study at the Howard School of Public Health via supplementation with 100 IU of Vitamin E per day. Supplementation above 30 IU has been established as a probable threshold for intake-based reduction of MI risk. Biochem Biophys. ActaLipids Lipid Metabol. (1991):1086(1), 134–138.

Vitamin C is also provided in these men's formula, because vitamin C requirements are increased in smokers and cigarette smoking is a major contributor to lung cancer in men.

Vitamin B1 is also provided in this men's formula because it plays an essential role in energy transformation. Thiamin diphosphate (TDP) is a coenzyme necessary for the conversion of carbohydrates to energy. Since U.S. men currently consume about 45% of their total calories from carbohydrates, vitamin B1 optimization in the diet is desirable.

Along with vitamin B6, vitamin B12 and folic acid supplementation help modulate blood levels of homocysteine. In the Framingham Heart Study, dietary and supplemental intake of folic acid was examined in 885 elderly subjects. The data showed an inverse relationship between folic acid intake and homocysteine concentrations. Tucker, K. L., et al., J. Nutr. (1996), 126:3025–3031. In another study, fasting total plasma homocysteine values were significantly and negatively correlated to serum vitamin B12 and blood folate concentrations. Anderson, A. et al., Euro J. Clin. Invest. (1992), 22:79–87.

Vitamin D (calciferol) is essential for formation of the skeleton and for mineral homeostasis. Without vitamin D, the small intestine cannot absorb adequate calcium regardless of how much calcium is available for absorption. Thus, vitamin D is indicated as a component of a men's nutritional supplement to help build strong bones.

Because clinical symptoms of manganese deficiency have yet to be clearly identified in humans, manganese enjoys neither RDA nor ESADDI status in governmental guidelines for mineral intake. However, the role of manganese in driving metalloenzyme manganese-superoxide dismutase (Mn-SOD) has been clearly identified, along with a similar role in other metalloenzyme systems (glutamine synthetase, arginase, and pyruvate carboxylase). Numerous enzyme systems have also been shown to undergo manganese activation, even though they are not manganese metalloenzymes. The manganese-SOD connection may be of special clinical importance, since this form of the metalloenzyme appears to be the sole operative form within the cell's mitochondrial membranes, and thus may play a unique role in protection of the mitochondria and assurance of the body's oxidative energy production system.

Zinc intake in the typical American man's diet is only 33 to 75 percent of RDA. Short-term zinc depletion is associated with decreases in men's semen volumes and serum testosterone concentrations. Zinc supplementation has been shown to improve sperm motility in subfertile men, although a high zinc semen concentration has also been related to depressed sperm motility in ejaculates of infertile men.

Additional nutrients are also supplied with this men's formula.

Micronutrients

The present invention also provides micronutrients. These micronutrients include vitamins, cofactors and minerals. For example the vitamins include vitamin A, vitamin C, vitamin E, riboflavin, niacin, niacinamide, pantothenic acid, pyridoxine, cobalamin, biotin, inositol, choline bitartrate, betaine, and vitamin K. The minerals include molybdenum, chromium and potassium.

Bioflavonoids and Antioxidants

Stress, exercise, and other conditions create free radicals in the body, which can cause damage to the body's components. To counter the free radicals, the present invention includes the following antioxidants and bioflavonoids in addition to vitamins C and E discussed above: citrus bioflavonoids, mixed carotenoids, green tea extract, and N-acetylcysteine.

FORMULATIONS

The components of the present invention are provided in bioavailable forms. This means that absorption and utilization are enhanced. As a result, more of the nutrients provided will actually be available to the individual, rather than being passed through the digestive track, unused by the body. However, other forms of the components could be used if the amounts of each component are adjusted to give similar bioavailable quantities.

The nutrients of this invention are supplied in tablets and gel capsules for convenience. The formulations listed below provide stability to the nutrients during the manufacturing process, and facilitate absorption of the nutrients by the body. However, other methods of delivery, such as in liquid or powder form, are equally acceptable. Additionally, the nutrients have been combined into tablets and gel capsules in set combinations, but other combinations would be acceptable. Further, the tablets may contain excipients, stabilizers, and other inert components.

EXAMPLE

For optimal packaging and ease of ingestion, the present formula may be provided in 5 tablets and 1 gel capsule. Each of the tablets may be provided as a pressed tablet also comprising standard excipients and stabilizers. These tablets and capsules can be formulated as follows:

TABLET 1

|  | preferred |  | range |  |
|---|---|---|---|---|
| Vitamin C (potassium/calcium ascorbate blend) | 420 | mg | 250–500 | mg |
| Citrus Bioflavonoids | 55 | mg | 50–200 | mg |

TABLET 2

| Vitamin A (acetate) | 2500 | IU | 1500–5000 | IU |
|---|---|---|---|---|
| Mixed Carotenoids (oil) | 2500 | IU | 1500–5000 | IU |
| Thiamin HCl B1 | 10 | mg | 6–14 | mg |
| Riboflavin B2 | 5 | mg | 3–6 | mg |
| Niacinamide B3 | 15 | mg | 8–15 | mg |
| Niacin B3 | 10 | mg | 8–15 | mg |
| Pantothenic Acid B5 (as Calcium Pantothenate) | 100 | mg | 30–100 | mg |
| Pyridoxine HCl B6 | 10 | mg | 5–20 | mg |
| Cobalamin B12 | 100 | mcg | 50–200 | mcg |
| Folic Acid | 400 | mcg | 280–400 | mcg |
| Biotin | 100 | mcg | 50–200 | mcg |
| Vitamin D | 200 | IU | 200–600 | IU |
| Vitamin K (phytonadione) | 80 | mcg | 80–150 | mcg |
| Inositol | 50 | mg | 30–100 | mg |
| Choline Bitartrate | 50 | mg | 30–100 | mg |
| Betaine HCl | 100 | mg | 50–200 | mg |
| Green Tea Extract (48% Polyphenols) | 20 | mg | 10–50 | mg |
| N-acetylcysteine | 10 | mg | 5–20 | mg |

TABLETS 3 AND 4
The following may be divided equally between two tablets:

| Calcium (carbonate and citrate) | 300 | mg | 300–500 | mg |
|---|---|---|---|---|
| Magnesium (oxide and citrate) | 200 | mg | 200–400 | mg |

TABLET 5

| Manganese (gluconate) | 2 | mg | 1–4 | mg |
|---|---|---|---|---|
| Zinc (citrate) | 15 | mg | 12–18 | mg |
| Copper (gluconate) | 3 | mg | 2.5–3.5 | mg |
| Iodide (potassium iodide) | 100 | mcg | 80–120 | mcg |
| Molybdenum (sodium molybdate) | 50 | mcg | 30–100 | mcg |
| Selenium (selenomethionine) | 200 | mcg | 100–250 | mcg |
| Chromium (nicotinate) | 200 | mcg | 100–500 | mcg |
| Potassium Citrate | 99 | mg |  |  |

SOFT GEL CAPSULE 1
The following nutrients may be supplied together:

| Vitamin E (d-1-alpha tocopherol) | 200 | IU | 150–400 | IU |
|---|---|---|---|---|
| Fish Oil (50% EPA/DHA) | 200 | mg | 200–500 | mg |
| Borage Oil (15% GLA) | 100 | mg | 100–250 | mg |

These nutrients may be provided as a soft gel capsule.

I claim:

1. A nutritional supplement for men, comprising nutrients in the following ratios:

omega-3 and omega-6 fatty acids in a ratio of about 2:1;

calcium and magnesium in a ratio of about between 1.3:1 and 1.5:1;

zinc and copper in a ratio of about 5:1;

selenium and iodide in a ratio of about 2:1; and pyridoxine, folate, and cobalamin in a ratio of about 100:4:1.

2. The supplement of claim 1 wherein the omega-3 fatty acids are provided in the form of fish oil.

3. The supplement of claim 1 wherein the omega-6 fatty acids are provided in the form of borage oil.

4. The supplement of claim 1 further comprising non-vitamin anti-oxidants.

5. The supplement of claim 4 wherein the oxidants are citrus bio-flavonoids, mixed carotenoids and N-acetyl cysteine.

6. The supplement of claim 1 wherein the omega-3 fatty acids are provided in the amount of 200 mg of fish oil and the omega-6 fatty acids are provided in the amount of 100 mg of borage oil, while maintaining the ratio of omega-3 to omega-6 fatty acids at about 2:1.

7. The supplement of claim 1 comprising between 300 and 500 mg of calcium and between 200 and 400 mg of magnesium, while maintaining the ratio of calcium to magnesium at about 1.5:1.

8. The supplement of claim 1 comprising between 12 and 18 mg of zinc and between 2.5 and 3.5 mg of copper, while maintaining the ratio of zinc to copper at about 5:1.

9. The supplement of claim 1 comprising between 100 and 250 micrograms of selenium and between 80 and 120 micrograms of iodine, while maintaining the ratio of selenium to iodide at about 2:1.

10. The supplement of claim 1 comprising between 5 and 20 mcg of pyridoxine, between 280 and 400 mcg of folate, and between 50 and 200 mcg of cobalamin, while maintaining the ratio of pyridoxine (vitamin B6) to folate to cobalamin (vitamin B 12) at about 100:4:1.

11. The supplement of claim 1 comprising nutrients in amounts that fall within the ranges provided in the Example while maintaining the ratios of claim 1.

12. The supplement of claim 10 comprising nutrients in the preferred amounts provided in the Example.

13. A method for maintaining optimal health of a man in need thereof, comprising administering the supplement of claim 1.

14. A method for maintaining optimal health of a man in need thereof, comprising administering the supplement of claim 2.

15. A method for maintaining optimal health of a man in need thereof, comprising administering the supplement of claim 3.

16. A method for maintaining optimal health of a man in need thereof, comprising administering the supplement of claim 4.

17. A method for maintaining optimal health of a man in need thereof, comprising administering the supplement of claim 5.

18. A method for maintaining optimal health of a man in need thereof, comprising administering the supplement of claim 6.

19. A method for maintaining optimal health of a man in need thereof, comprising administering the supplement of claim 7.

20. A method for maintaining optimal health of a man in need thereof, comprising administering the supplement of claim 8.

21. A method for maintaining optimal health of a man in need thereof, comprising administering the supplement of claim 9.

22. A method for maintaining optimal health of a man in need thereof, comprising administering the supplement of claim 10.

23. A method for maintaining optimal health of a man in need thereof, comprising administering the supplement of claim 11.

24. A method for maintaining optimal health of a man in need thereof, comprising administering the supplement of claim 12.

* * * * *